(12) United States Patent
Matsueda

(10) Patent No.: US 7,995,846 B2
(45) Date of Patent: Aug. 9, 2011

(54) FORM DISPLAY METHOD, APPARATUS, AND STORAGE MEDIUM STORING A PROGRAM FOR AN INFORMATION PROCESSING APPARATUS, THAT DETERMINE FORM TYPES CORRESPONDING TO OBTAINED ELECTRIC IMAGE DATA

(75) Inventor: Kazutaka Matsueda, Yokohama (JP)

(73) Assignee: Canon Kabushiki Kaisha (JP)

( * ) Notice: Subject to any disclaimer, the term of this patent is extended or adjusted under 35 U.S.C. 154(b) by 1529 days.

(21) Appl. No.: 11/338,126

(22) Filed: Jan. 24, 2006

(65) Prior Publication Data

US 2006/0165295 A1    Jul. 27, 2006

(30) Foreign Application Priority Data

Jan. 25, 2005    (JP) .................................. 2005-017411

(51) Int. Cl.
*G06K 9/00*    (2006.01)
*G06K 9/62*    (2006.01)

(52) U.S. Cl. ....................................... 382/224; 382/100
(58) Field of Classification Search .................. 382/100, 382/181, 224; 715/221, 273, 277
See application file for complete search history.

(56) References Cited

U.S. PATENT DOCUMENTS

| | | | | |
|---|---|---|---|---|
| 6,741,743 B2 * | 5/2004 | Stalcup et al. | ................ | 382/217 |
| 2003/0081824 A1 * | 5/2003 | Mennie et al. | ................ | 382/135 |

* cited by examiner

*Primary Examiner* — Yubin Hung
(74) *Attorney, Agent, or Firm* — Rossi, Kimms & McDowell LLP

(57) ABSTRACT

A form display method which enhances convenience for an operator who corrects a result of form recognition on electronic image data obtained from documents of unknown type, so that the operator can properly perform correction. Electronic images are acquired, and form types of the electronic images are recognized. It is determined whether the recognized electronic images are corresponding ones of forms registered in advance or unrecognizable forms. A method of displaying the unrecognizable forms is set in advance. The determined forms are displayed in accordance with the set display method.

5 Claims, 17 Drawing Sheets

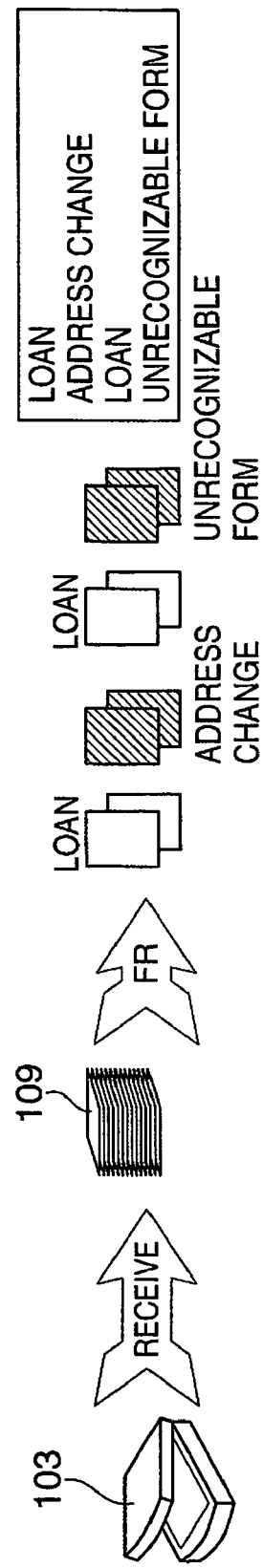

FORM RECOGNITION RESULT REPRESENTATION 3

| | |
|---|---|
| LOAN | 2 SHEETS |
| ADDRESS CHANGE | 2 SHEETS |
| LOAN | 2 SHEETS |
| UNRECOGNIZABLE FORM | 1 SHEET |
| UNRECOGNIZABLE FORM | 1 SHEET |

FORM RECOGNITION RESULT REPRESENTATION 4

| | |
|---|---|
| LOAN | 2 SHEETS |
| ADDRESS CHANGE | 2 SHEETS |
| LOAN | 4 SHEETS |

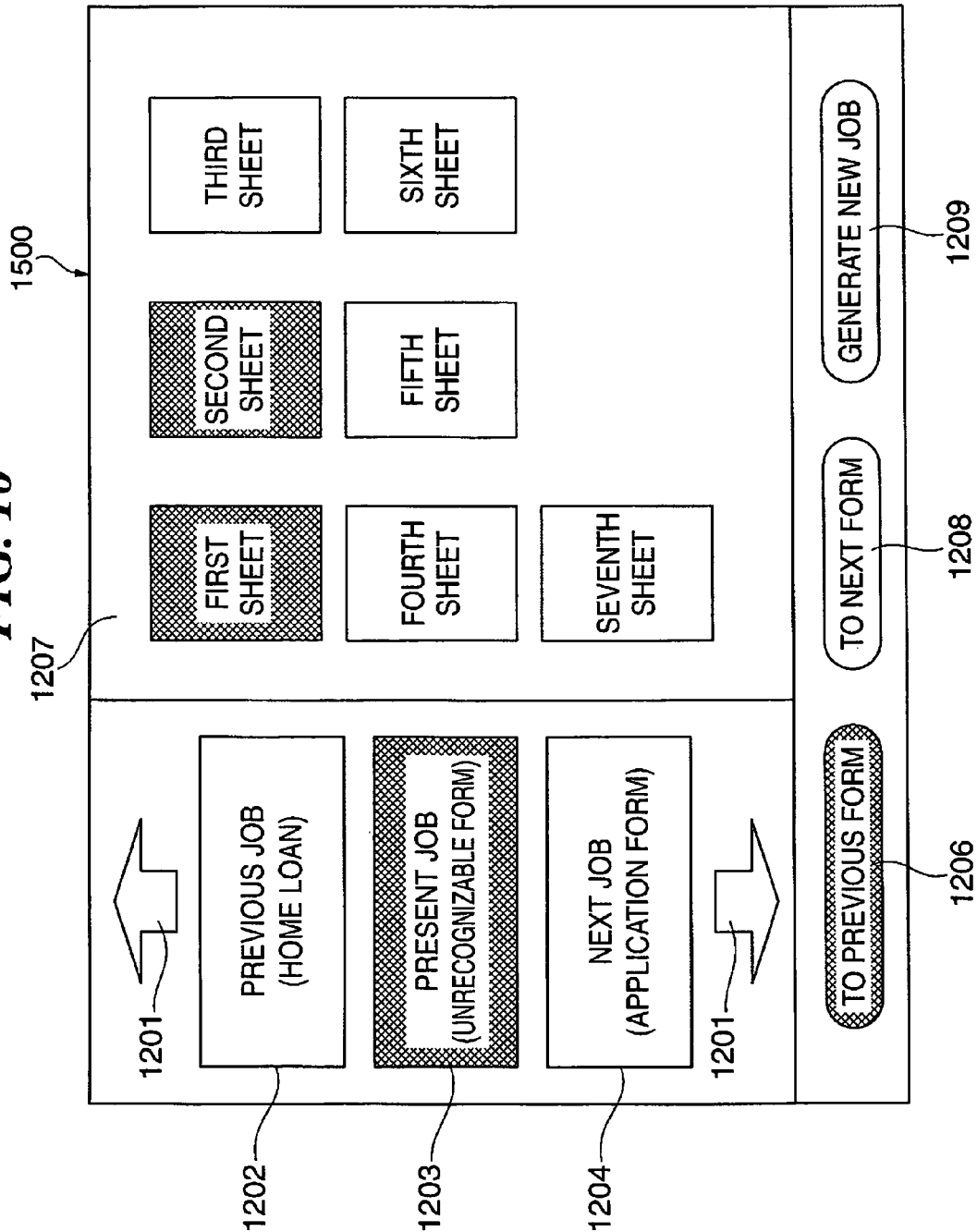

FORM DISPLAY METHOD, APPARATUS, AND STORAGE MEDIUM STORING A PROGRAM FOR AN INFORMATION PROCESSING APPARATUS, THAT DETERMINE FORM TYPES CORRESPONDING TO OBTAINED ELECTRIC IMAGE DATA

BACKGROUND OF THE INVENTION

1. Field of the Invention

The present invention relates to a form display method, a form display apparatus, a program for implementing the method, and a storage medium storing the program. In particular, the present invention relates to a form display method and a form display apparatus that carry out form recognition and character recognition on electronic images obtained by reading various documents such as forms and application forms, as well as a program for implementing the method and a storage medium storing the program.

2. Description of the Related Art

Conventionally, various documents such as forms and application forms are sent as sheet media to e.g. an office work management center of a company, converted into electronic images through the manual intervention, and stored in a database of a server in the company.

In recent years, systems have been increasingly used in which facsimile image data of various documents and electronic image data read by a scanner are received and form recognition and character recognition are carried out on the received data, thereby automatically performing jobs. For example, there has been a form reading method which recognizes printed or handwritten characters on forms such as transfer slips for use in exchange business in financial institutions. In this form reading method, characters on a form captured as an image are read to determine the type of the form. There has been proposed a technique for, in the case where the type of a form has not been successfully determined, determining the type of the form based upon a manually-input form type and carrying out reading of characters on the form based upon the determined form type. With this technique, even in the case where a form to be scanned is defective, characters on it can be correctly recognized.

With the above conventional technique, form recognition and character recognition can be automatically carried out on received electronic images using business software, but recognition accuracy is not satisfactory, and hence recognition results have to be manually corrected in some cases. If there is any electronic image that cannot be recognized as a form, the following problems may arise.

1. In the case where a plurality of continuous unrecognizable forms are displayed as one job in list form, when an operator who checks the job finds that the job actually consists of a plurality of types of forms, he/she has to carry out complicated operations so as to divide the job into single forms.

2. Conversely, in the case where a plurality of continuous unrecognizable forms are displayed on page basis as a plurality of jobs in list form, when an operator who checks the jobs finds that these jobs actually consist of one form that extends over a plurality of sheets, he/she has to carry out complicated operations so as to combine the jobs into one form.

3. In the case where handwritten introductory notes are added as attachment data to forms, such attachment data cannot be registered in advance as part of the forms since they are formed in a wide variety of formats. For this reason, when form recognition is carried out on such forms, they are regarded as unrecognizable forms. As a result, it is necessary to carry out complicated operations so as to combine a previous job and attachment data into one form.

4. In the above cases 1 to 3, if a server receives a plurality of electronic image data from a plurality of client computers, data received from different client computers may be meaninglessly combined with one another unless they are combined in reception units.

SUMMARY OF THE INVENTION

It is an object of the present invention to provide a form display method and a form display apparatus that enhance convenience for an operator who corrects a result of form recognition on electronic image data obtained from documents of unknown type, so that the operator can properly perform correction, and a program for implementing the form display method and a storage medium storing the program.

To attain the above object, in a first aspect of the present invention, there is provided a form display method for an information processing apparatus comprising an acquiring step of acquiring at least one electronic image, a recognizing step of recognizing a form type of each of the acquired electronic images, a determining step of determining whether the recognized electronic image corresponds to any of forms registered or an unrecognizable form, a setting step of setting a method of displaying the unrecognizable form; and a displaying step of displaying the determined form in accordance with the set display method.

With this construction, it is possible to enhance convenience for an operator who corrects a result of form recognition on electronic image data obtained from documents of unknown type, so that the operator can properly perform correction.

To attain the above object, in a second aspect of the present invention, there is provided a form display apparatus that carries out form recognition on electronic images obtained by reading images of various documents, comprising an acquiring device that acquires at least one electronic image, a recognizing device that recognizes a form type of each of the acquired electronic images, a determining device that determines whether the recognized electronic image corresponds to any of forms registered in advance or an unrecognizable form, a setting device that sets in advance a method of displaying the unrecognizable form, and a display device that displays the determined form in accordance with the set display method.

To attain the above object, in a third aspect of the present invention, there is provided a computer-readable program for causing a computer to implement a form display method, comprising an acquiring module for acquiring at least one electronic image, a recognizing module for recognizing a form type of each of the acquired electronic images, a determining module for determining whether the recognized electronic image corresponds to any of forms registered or an unrecognizable form, a setting module for setting a method of displaying the unrecognizable form, and a display module for displaying the determined form in accordance with the set display method.

To attain the above object, in a fourth aspect of the present invention, there is provided a storage medium storing a program for causing a computer to implement a form display method, the program comprising an acquiring module for acquiring at least one electronic image, a recognizing module for recognizing a form type of each of the acquired electronic images, a determining module for determining whether the recognized electronic image corresponds to any of forms registered or an unrecognizable form, a setting module for setting a method of displaying the unrecognizable form, and a display module for displaying the determined form in accordance with the set display method.

The above and other objects, features, and advantages of the invention will become more apparent from the following detailed description taken in conjunction with the accompanying drawings.

BRIEF DESCRIPTION OF THE DRAWINGS

FIG. 5 is a diagram schematically showing steps S1 and S2 in the control flow in FIG. 4;

FIGS. 6A to 6D are views showing examples of screens displayed on a CRT in the flow in FIG. 5, in which FIG. 6A shows a form recognition result representation 1; FIG. 6B, a form recognition result representation 2; FIG. 6C, a form recognition result representation 3; and FIG. 6D, a form recognition result representation 4;

FIG. 16 is a view showing an example of a screen that is displayed when desired form job is selected on the screen in FIG. 15.

DETAILED DESCRIPTION OF THE PREFERRED EMBODIMENTS

The present invention will now be described in detail with reference to the drawings showing a preferred embodiment thereof.

Figure 1:
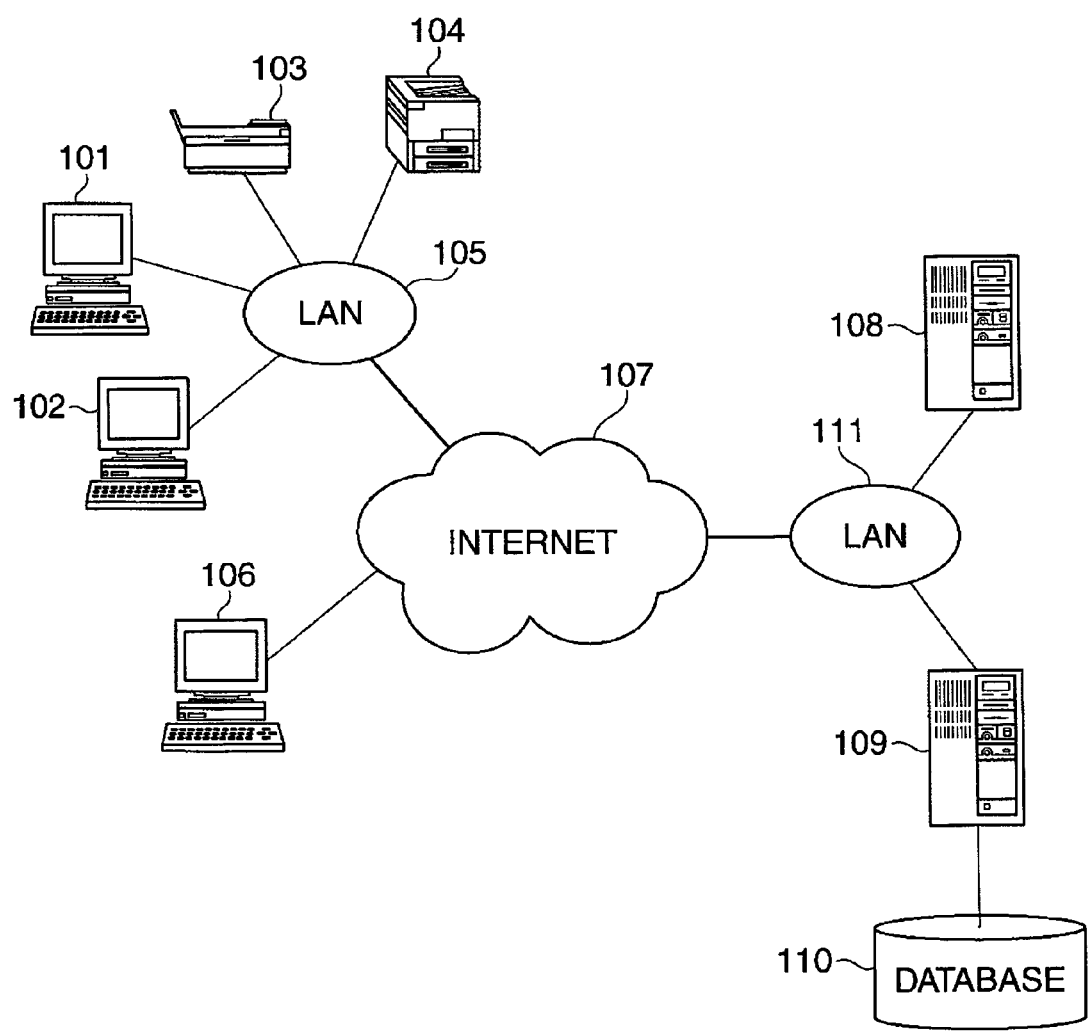
FIG. 1 is a view showing the overall arrangement of a business processing system to which a form display method according to an embodiment of the present invention is applied.

FIG. 1 is a view showing the overall arrangement of a business processing system to which a form display method according to an embodiment of the present invention is applied.

Referring to FIG. 1, in the business processing system installed in, e.g. a company, various documents such as application forms sent from users by mail and forms brought from branch offices of the company are read by a scanner or the like and converted to electronic images. The resultant electronic images are subjected to form recognition or character recognition, subjected to application approval as needed, and registered as electronic documents in a server or the like.

The business processing system is comprised of client computers (hereinafter referred to as "the client PCs") 101 and 102, a scanner 103 and a multifunction peripheral (MFP) 104 shared on a network, a LAN (Local Area Network) 105 that connects the client PCs 101 and 102, the scanner 103, and the MFP 104 to one another, the Internet 107 connected to the LAN 105, and a client PC 106 that is directly connected to the Internet 107. The business processing system is further comprised of an HTTP server 108, a Web application server 109, a database 110 connected to the Web application server 109, and a LAN 111 that connects the HTTP server 108, the Web application server 109, and the database 110 to one another and is connected to the Internet 107. Although only one Web application server 109 is illustrated in FIG. 1, a plurality of Web application servers 109 may be connected to the LAN 111.

The client PCs 101, 102, and 106 send and receive data to and from other devices such as the Web application server 109 via the LAN 105 and the LAN 111.

In the present embodiment, the client PCs 101, 102, and 106 are used for administrators of the business processing system to register new data files and perform maintenance such as correcting user management information. The client PCs 101, 102, and 106 are also used for operators who carry out registration to assort and check electronic documents acquired by the Web application server 109. The client PCs 101, 102, and 106 are also used for approvers to carry out application approval.

The scanner 103 is an image reader that reads images on various documents such as application forms and forms. The MFP 104 is a multi-function printer that has a plurality of functions such as a copying function and a facsimile function. The MFP 104 is capable of registering facsimile images, which are received from an external device, in the Web application server 109 via the LAN 105 and the Internet 107.

The HTTP server 108 is a server computer that receives requests transmitted from the client PC 101 and others according to the HTTP protocol via networks such as the LAN 105 and the Internet 107. A plurality of Web application servers including the Web application server 109 are registered in the HTTP server 108. The HTTP server 108 transfers a request received from the client PC 101 or the like to an appropriate Web application server in accordance with the contents of the request.

Upon receiving a request from the HTTP server 108, the Web application server 109 carries out processing in accordance with the request and returns the processing result to the client PC 101 or the like.

The database 110 stores system information such as data received by the Web application server 109, character recognition results, information on application processing status, user/group information, and information on processing of registered data files.

The business processing system functions as a Web database system, in which the HTTP server 108, the Web application server 109, and the database 110 are consistently and closely combined with one another.

Figure 2:
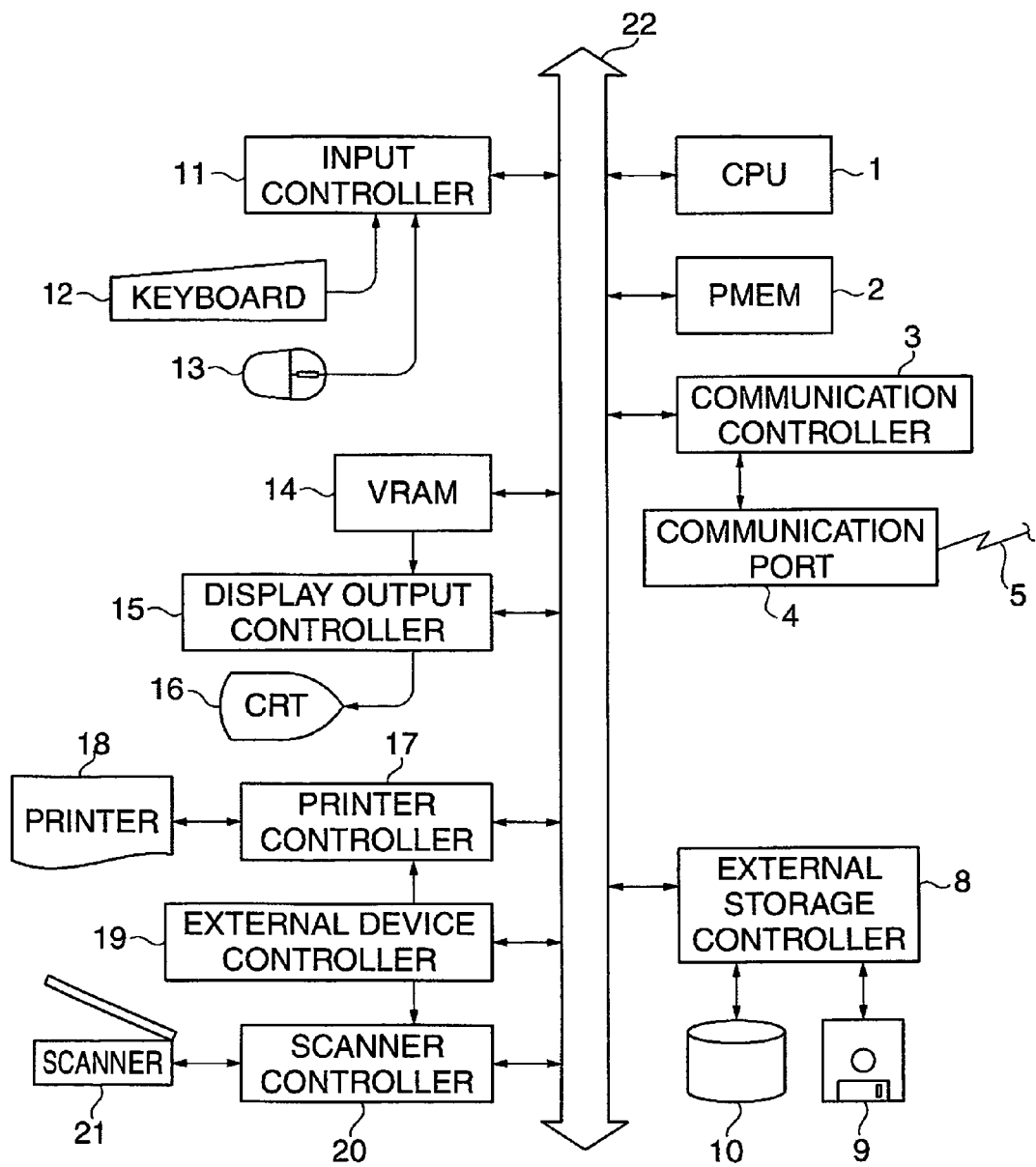
FIG. 2 is a block diagram showing the basic hardware configuration of client PCs and servers appearing in FIG. 1.

FIG. 2 is a block diagram showing the basic hardware configuration of the client PCs and the servers appearing in FIG. 1.

As shown in FIG. 2, the client PCs 101, 102, and 106, the HTTP server 108, and the Web application server 109 appearing in FIG. 1 are each comprised mainly of a CPU (Central Processing Unit) 1, a PMEM 2, a communication controller 3 that is connected to a communication line 5 via a communication port 4, and an external storage controller 8 that is connected to a data file disk (FD) 9, which is implemented by e.g. a floppy (registered trademark) disk, and a hard disk (HD) 10. The client PCs 101, 102, and 106, the HTTP server 108, and the Web application server 109 are each further comprised of an input controller 11 that is connected to a keyboard 12 and a mouse 13, a VRAM 14, a display output controller 15 that is connected to the VRAM 14 and a CRT 16, and a printer controller 17 that is connected to a printer 18. The client PCs 101, 102, and 106, the HTTP server 108, and the Web application server 109 are each further comprised of a scanner controller 20 that is connected to a scanner 21, an external device controller 19 that is connected to the printer controller 17 and the scanner controller 20, and a system bus 22 through which these component elements are connected to one another.

The CPU 1 selects and reads out appropriate control programs from the PMEM 2 and executes them so as to carry out processes, described later. The PMEM 2, which is implemented by e.g. a nonvolatile memory, is a program memory that stores control programs. The PMEM 2 also serves as a text memory that stores data input from the keyboard 12 as coded information.

The communication controller 3 controls data input and output via the communication port 4. A signal that is output via the communication port 4 is transmitted to a communication port of another device on the network via the communication line 5. It is to be understood that the communication port 4 and the communication line 5 conform to networks such as a LAN, but may conform to an ordinary public line.

The input controller 11 gives instructions on operation of the system in response to operation of the keyboard 12, the mouse 13, and so forth by an operator. The mouse 13 is a pointing device (PD) for performing processing on an image displayed on the CRT 16 or issuing instructions on the image. The operator can move a cursor, not shown, displayed on the CRT 16 in an arbitrary direction using the mouse 13. For example, the operator can designate processing by selecting a command icon on a command menu displayed on the CRT 16, and designate an object to be edited and a drawing position.

The VRAM 14 is a video image memory in which bit map image data is expanded that is used for displaying an image displayed on the CRT 16. The printer controller 17 controls the output of data to the printer 18. The scanner controller 20 controls the scanner 21's image reading operation.

Although in FIG. 1, the keyboard 12, the mouse 13, the CRT 16, the printer 18, and the scanner 21 are included in the basic hardware component elements of the computer, they may be configured separately therefore.

Also, the control programs stored in the PMEM 2 may be alternatively stored in a storage device such as the HD 10, which is directly connected to the apparatus, and a storage medium such as the FD 9. Alternatively, the control programs stored in the PMEM 2 may be stored in another apparatus on the network. In these alternative forms, the control programs are supplied from a storage device such as the HD 10, a storage medium such as the FD 9, or another apparatus on the network to the concerned client PC or server.

Figure 3A:
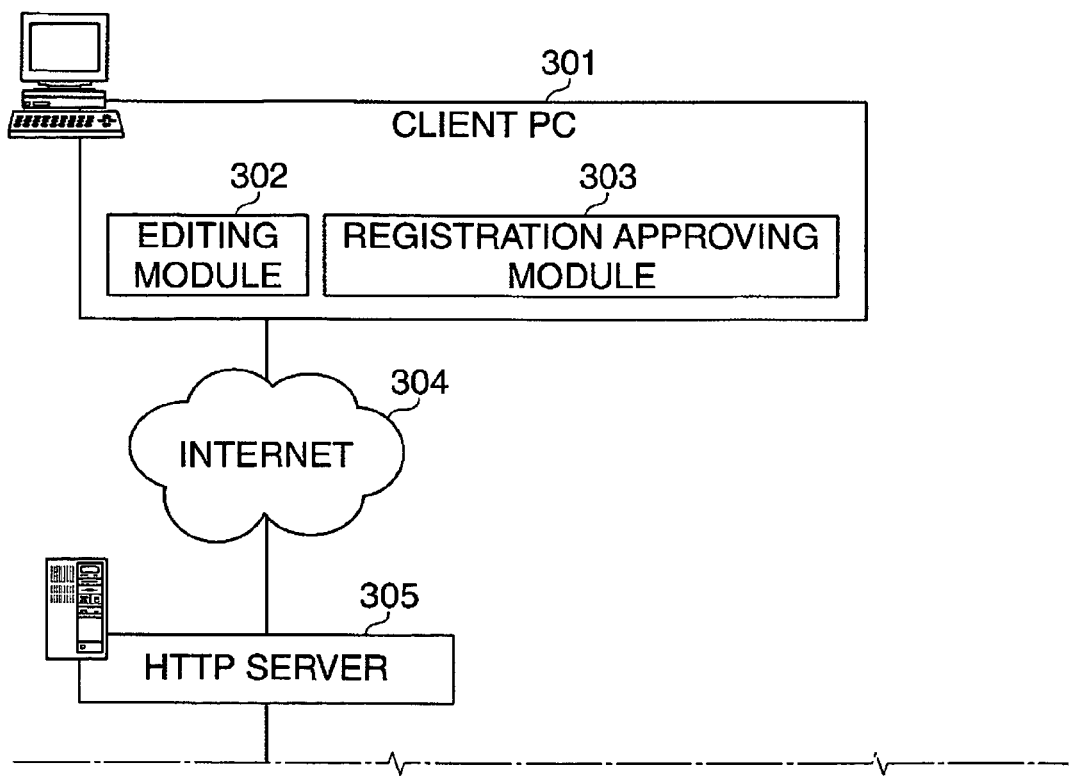
FIGS. 3A and 3B are block diagrams showing the basic software configuration of the client PCs and the servers appearing in FIG. 1.
Figure 3B:
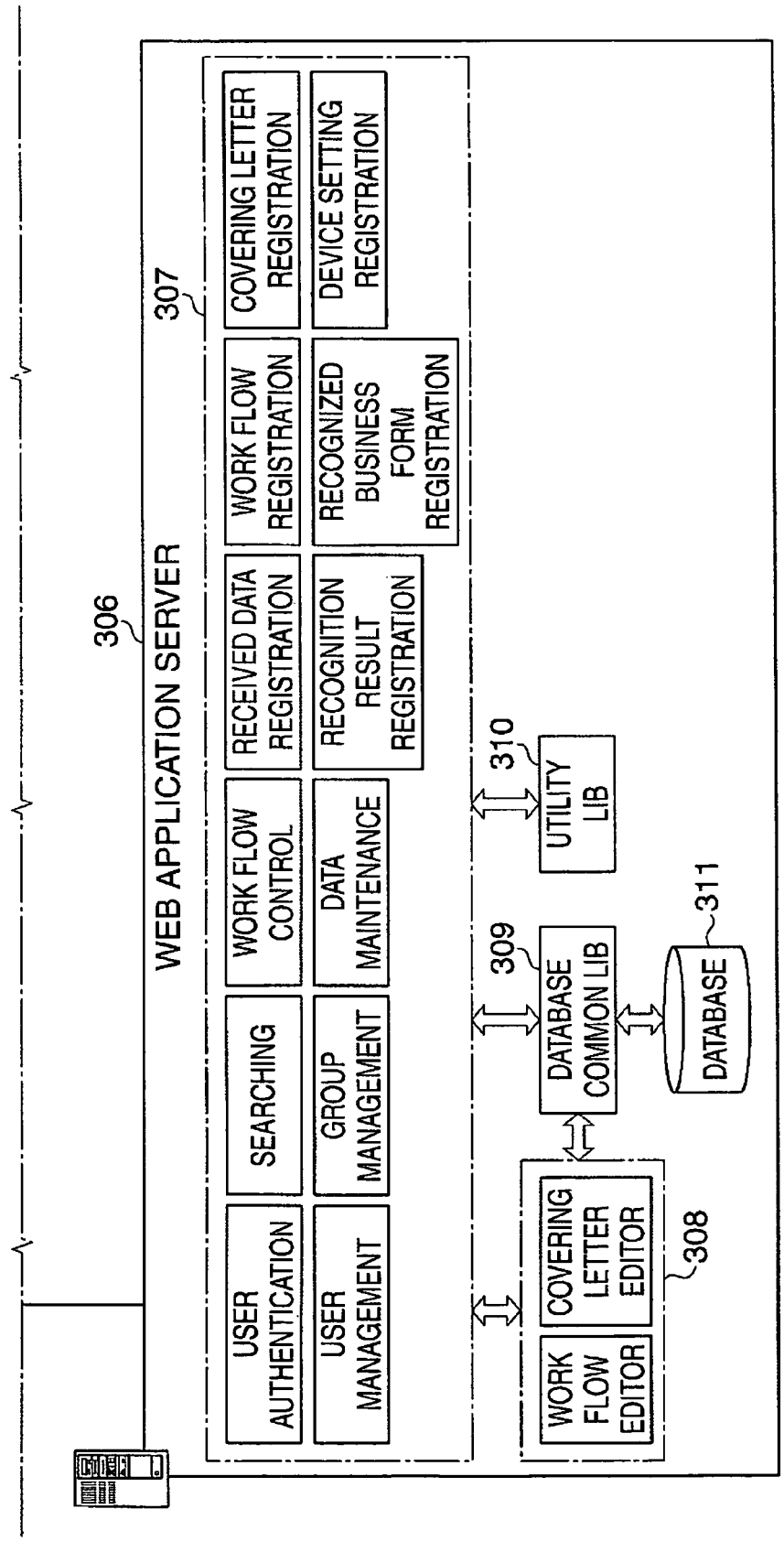

FIGS. 3A and 3B are block diagrams showing the basic software configuration of the client PCs and the servers appearing in FIG. 1.

A client PC 301 in FIG. 3A, which corresponds to the client PCs 101, 102, and 106, is comprised of an editing module 302 for editing form data to be registered and already registered in the server, and a registration approving module 303 for approving registration of form data in the server.

A network 304 corresponds to the LANs 105 and 111 and the Internet 107. An HTTP server 305 corresponds to the HTTP server 108.

A Web application server 306, which corresponds to the Web application server 109, has a module 307 for processing requests from the HTTP server 305. The module 307 includes various modules for user authentication, searching, work flow control, received data registration, work flow registration, covering letter registration, user management, group management, data maintenance, recognition result registration, recognized form registration, and device setting registration. These modules are loaded onto a memory and executed in accordance with requests from the client PC 301.

The Web application server 306 has an editor module 308 including a work flow editor module and a covering letter editor module, and a database common library (Lib) module 308 for sending and receiving data to and from a database 311 that corresponds to the database 110, and a utility library (Lib) module 310.

Figure 4:
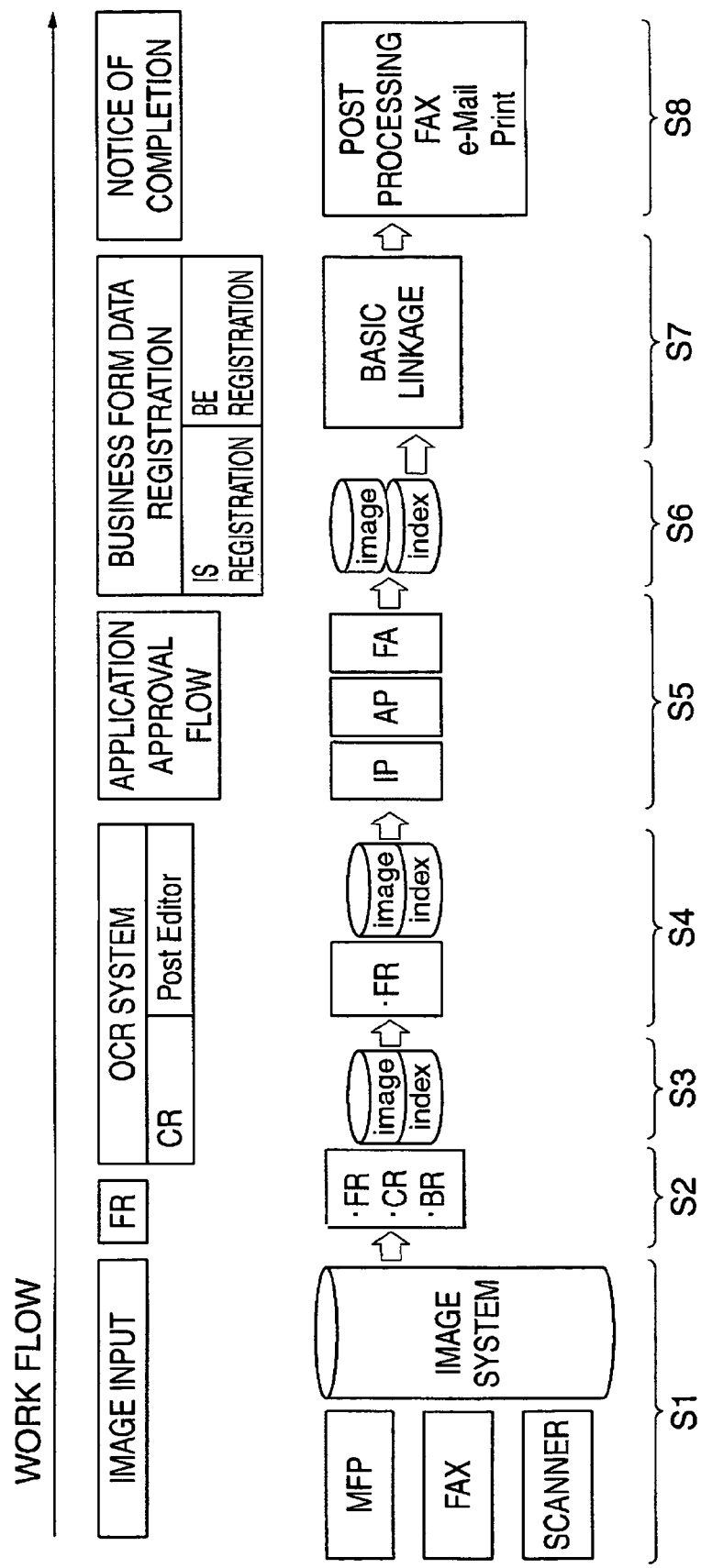
FIG. 4 is a diagram schematically showing the entire control flow executed in the business processing system in FIG. 1.

FIG. 4 is a diagram schematically showing the entire control flow executed in the business processing system in FIG. 1.

In FIG. 4, "S1" denotes a step in which data is acquired from a facsimile, a scanner, an MFP, or the like via a network and captured into a server.

"S2" denotes a step in which form recognition (FR) is carried out on the acquired data to determine to what type of form or application form the acquired data belongs. "S3" denotes a step in which character recognition (CR) or barcode recognition (BR) is carried out on the acquired data to extract characters from the form or application form determined in the step S2. "S4" denotes a step in which an operator called a post editor (PE) corrects the characters recognized in the step S3 while looking at a screen on a computer (PC).

"S5" denotes a step in which a work flow (PA flow) for application approval is carried out on the application form or the like. "S6" denotes a step in which the data is registered in the server. "S7" denotes a step in which the data is registered in a backend server, not shown. "S8" denotes a step in which post processing is carried out. The post processing includes sending a notice of registration confirmation by facsimile, e-mail, mail, or the like to a user who sent the application form or the like.

In the control flow in FIG. 4, which is called a "work flow" or a "business process", the steps S2 to S8 can be selectively set to ON or OFF using application software according to the type of acquired data (form). For example, in a case where application approval is carried out on a "loan application form" without carrying out an optical character recognition (OCR) after form recognition, the steps S1, S2, S5, S6, S7, and S8 in the work flow are set in this order with the steps S3 and S4 being set to OFF. Similarly, in a case where a "car loan application form" is registered in a base server after post edition, the steps S1, S2, S3, S4, and S7 in the work flow are set in this order with the steps S5 and S6 being set to OFF.

The form recognition in the step S2 is selectively set to ON or OFF via a system setting screen in FIG. 8, described later. The work flow can be configured by a work flow registering module included in the module 307 in FIG. 3B.

Next, referring to FIGS. 5 and 6, a description will be given of a flow in which the Web application server 109 acquires eight forms read by the scanner 103, carries out form recognition on the forms, and displays the recognition result. This flow corresponds to the steps S1 to S4 in FIG. 4.

FIG. 5 is a diagram schematically showing the flow in the steps S1 and S2 in FIG. 4.

As shown in FIG. 5, in the Web application server 109 that has acquired eight forms read by the scanner 103, the forms are subjected to form recognition, subjected to character recognition or the like, and then subjected to editing by the PE. There may be cases where a plurality of PEs carry out editing depending on the circumstances so as to improve work efficiency. In such cases, no problem arises if the types of all the forms can be recognized through form recognition, but if the forms include any unrecognizable forms (hereinafter referred to as "unknown forms"), competition for the unrecognizable forms occurs among the PEs, resulting in a decreased work efficiency. To obviate this, in the present embodiment, form recognition results can be displayed on the CRT 16 in a selected one of four types of representation. FIGS. 6A to 6D show, by way of example, form recognition result representations that can be displayed on the CRT 16.

Figure 6A:
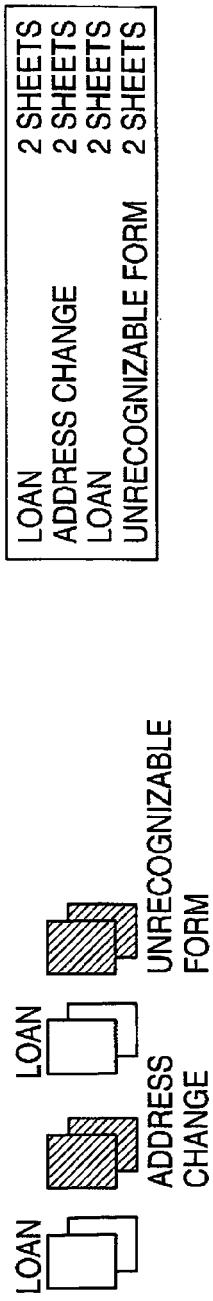

A form recognition result representation 1 in FIG. 6A is an example in which two continuous unrecognizable forms are displayed as one job (or one set). In the result representation 1, two loan forms, two address change forms, two loan forms, and two unrecognizable forms are displayed separately from one another. The result representation 1 has the advantage that in the case where unrecognizable forms are actually sets of two forms, one PE can edit all the unrecognizable forms.

Figure 6B:

A result representation 2 in FIG. 6B is an example in which part of unrecognizable forms is displayed in the form of data attached to a previous job ("loan forms" in this example). In the result representation 2, two loan forms, two address change forms, three loan forms including one unrecognizable form, and one unrecognizable form are displayed. In the present embodiment, in the case where part of unrecognizable forms is added to as attachment data to a previous job, a limit on the number of unrecognizable forms to be added as attachment data can be set on a screen in FIG. 7. The set number of unrecognizable forms can be displayed as data attached to the previous job.

Figure 6C:
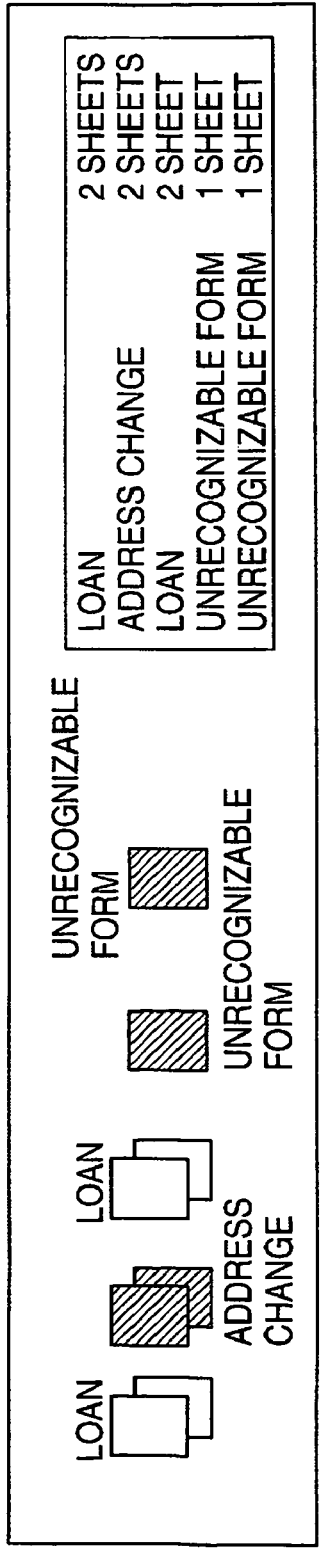

A result representation 3 in FIG. 6C is an example in which unrecognizable forms are not attached to a previous job, but are displayed as respective jobs. In the result representation 3, two loan forms, two address change forms, two loan forms, one unrecognizable form, and one unrecognizable form are displayed. This display method is advantageous in the case where unrecognizable forms are edited one by one, and can be set on the screen in FIG. 7.

Figure 6D:
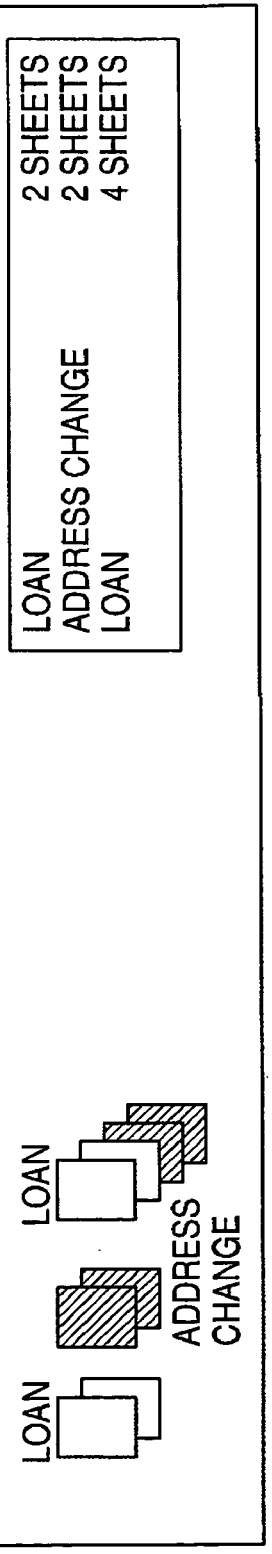

A result representation 4 in FIG. 6D is an example in which all the unrecognizable forms are displayed in the form of data attached to a previous job. In the result representation 4, two loan forms, two address change forms, and four loan forms including two unrecognizable forms are displayed. In the result representation 4, there is no competition for unrecognizable forms among the PEs, but the need to separate loan forms and unrecognizable forms from each other may arise later.

Figure 15:
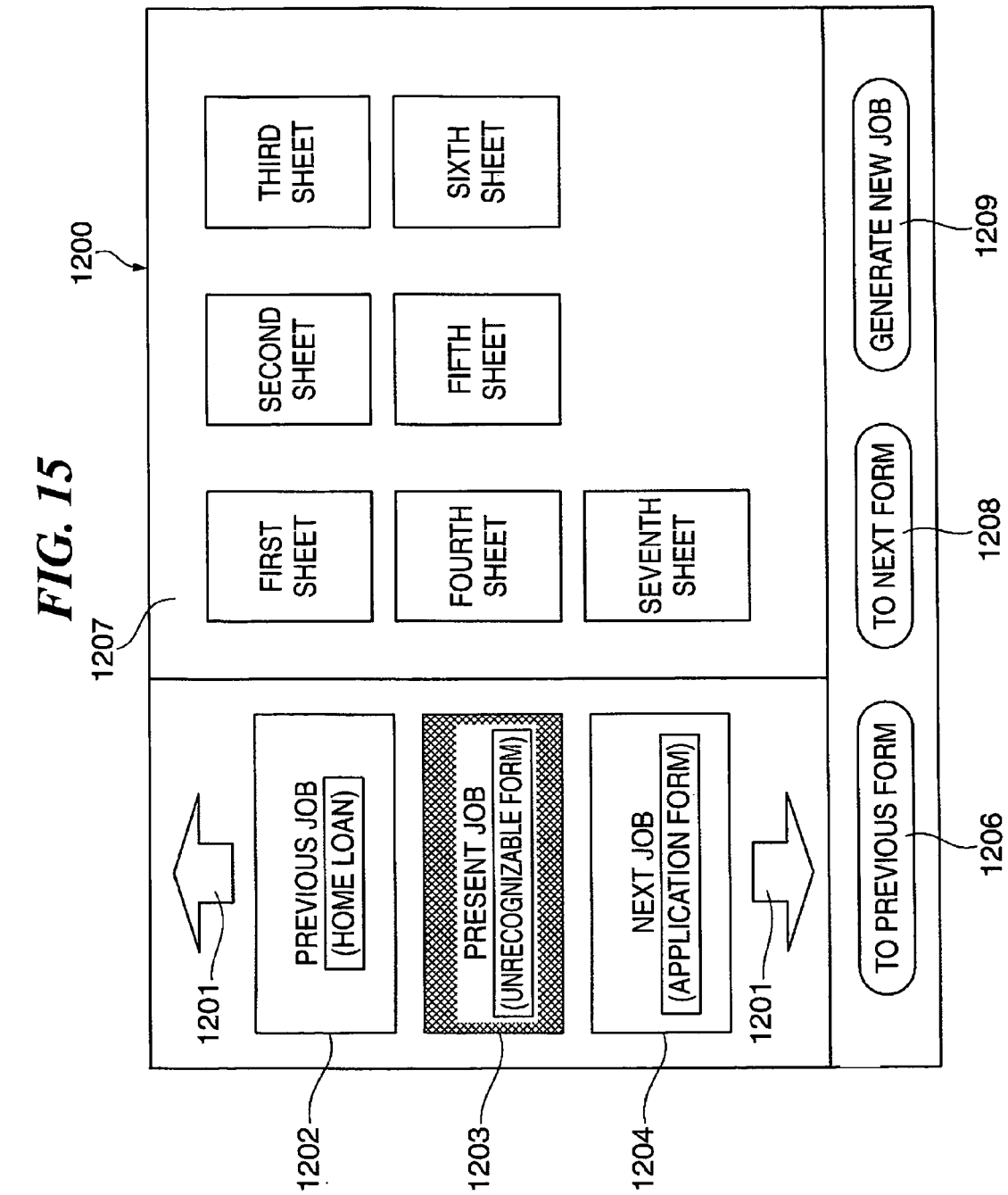
FIG. 15 is a view showing an example of a screen for separating unrecognizable forms from one job or combining unrecognizable forms into one job.

By changing the display method depending on the circumstances as stated above, work efficiency can be improved. Although in the present embodiment, an explanation has been given of the case where eight-form data is acquired in one communication, the data can be displayed in the same manner even in the case where the data is acquired in two separate communications. In this case, it may be necessary to combine unrecognizable forms, or to add unrecognizable forms as attachment data to a previous job. In FIGS. 15 and 16, referred to later, there are shown examples of a screen on which unrecognizable forms are combined into one job and unrecognizable forms are added as attachment data to a previous job.

Figure 7:
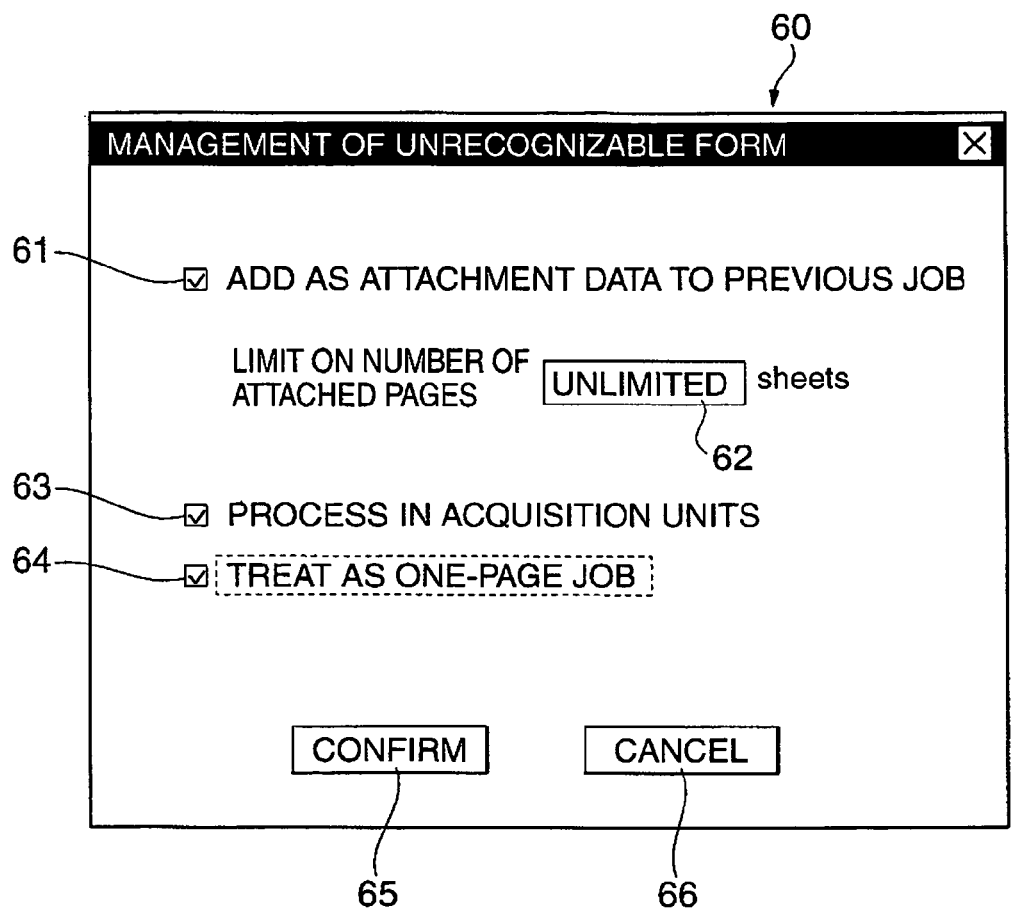
FIG. 7 is a view showing an example of a screen for setting how to deal with an unrecognizable form.

FIG. 7 is a view showing an example of a screen for setting how to deal with unrecognizable forms.

In FIG. 7, an unrecognizable form setting screen 60 is a maintenance screen that can be accessed by a system administrator anytime after startup of the system, and is displayed on the CRT 16 of the client PC 101 or the like.

On the unrecognizable form setting screen 60, there are displayed a check box 61 for setting whether to add an unrecognizable form as attachment data to a previous job when the unrecognizable form appears, an area 62 into which a limit on the number of unrecognizable forms to be set as attachment data to a previous job is entered in the case where the check box 61 is checked, a check box 63 for setting whether to deal with unrecognizable forms in acquisition units, and a check box 64 for setting whether to process unrecognizable forms as one job.

The check boxes 61, 63, and 64 are implemented by software switches for selectively setting the steps in the work flow in FIG. 4 to ON or OFF as stated above. A limit on the number of unrecognizable forms is typically entered into the area 62, but when the word "unlimited" is entered into the area 62 as illustrated, an unlimited number of unrecognizable forms that appear can be added as attachment data to a previous job.

In the case where the check box 63 is checked, one or more unrecognizable forms are treated as one job in acquisition units. For example, in the case where the last image of form data is determined as being an unrecognizable form, and the first image of the form data acquired next is also determined as being an unrecognizable form, these two images are not combined into one job.

In the case where the check box 64 is checked, a plurality of continuous unrecognizable forms are not displayed as one job, but always divided into respective single forms and displayed as respective jobs.

A confirmation button 65 is for confirming the above settings. A cancel button 66 is for canceling the above settings and restoring the unrecognizable form setting screen 60 to its previous state.

Figure 8:
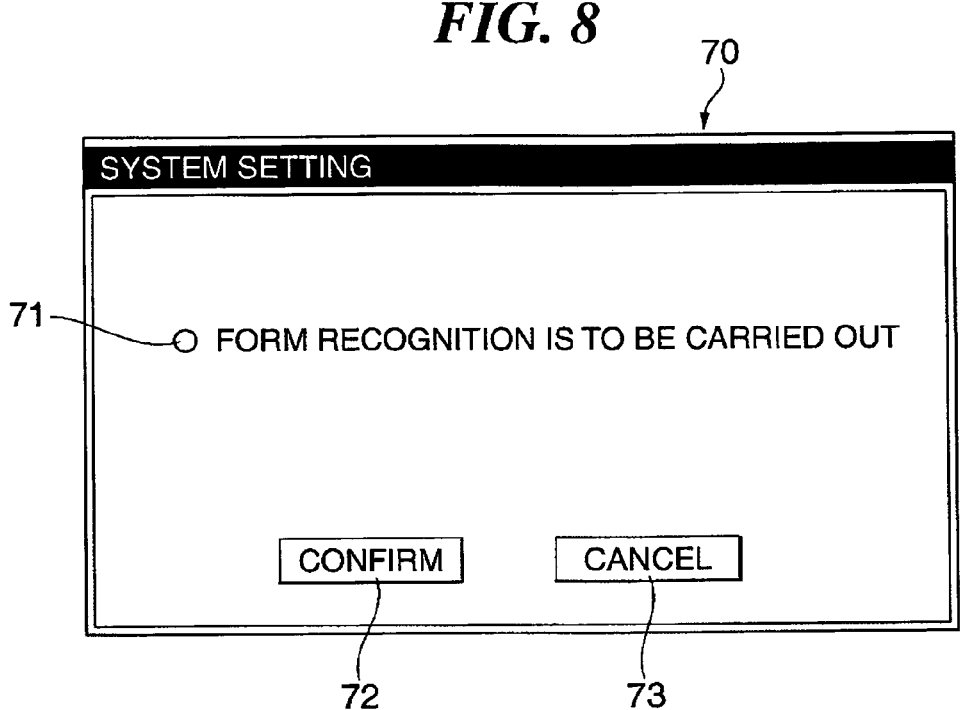
FIG. 8 is a view showing an example of a screen for carrying out system setting.

FIG. 8 is a view showing an example of a screen for system setting.

As is the case with the above unrecognizable form setting screen 60, a system setting screen 70 in FIG. 8 is a maintenance screen that can be accessed by a system administrator anytime after startup of the system, and is displayed on the CRT 16 of the client PC 101 or the like.

A check hole 71 for setting whether to carry out form recognition is displayed on the system setting screen 70. The check hole 71 is unchecked when the types of forms to be acquired are known in advance, because form recognition is not carried out when the check hole 71 is unchecked. In the case where the check hole 71 is unchecked, no unrecognizable form appears since form recognition is not carried out. A confirmation button 72 is for confirming the above setting. A cancel button 73 is for canceling the above setting and restoring the system setting screen 70 to its previous state.

Figure 9:
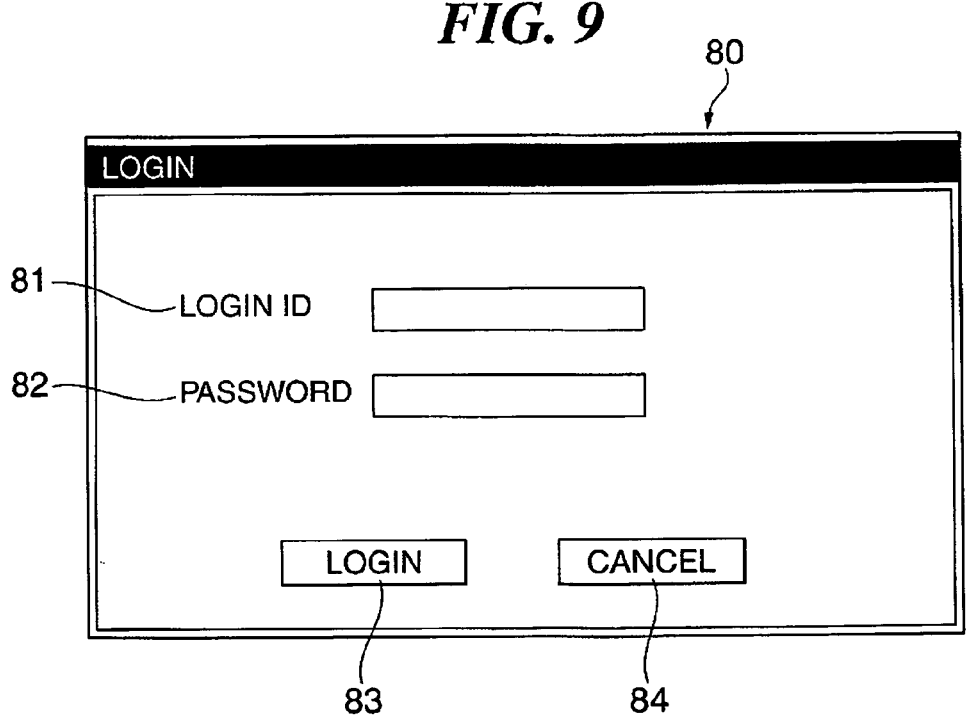
FIG. 9 is a view showing an example of a screen for logging into the system.

FIG. 9 is a view showing an example of a screen for logging into the system.

A login screen 80 in FIG. 9 is displayed by an OS (Operating System), a browser, or the like, but may be displayed by application software installed in advance in the client PC or the like. On the login screen 80, there are displayed an area 81 into which a login ID is entered via the keyboard 12, an area 82 into which a password is entered, a login button 83 that is depressed after data are entered into the areas 81 and 82, and a cancel button 84 for closing the login screen 80 without login.

Figure 10:
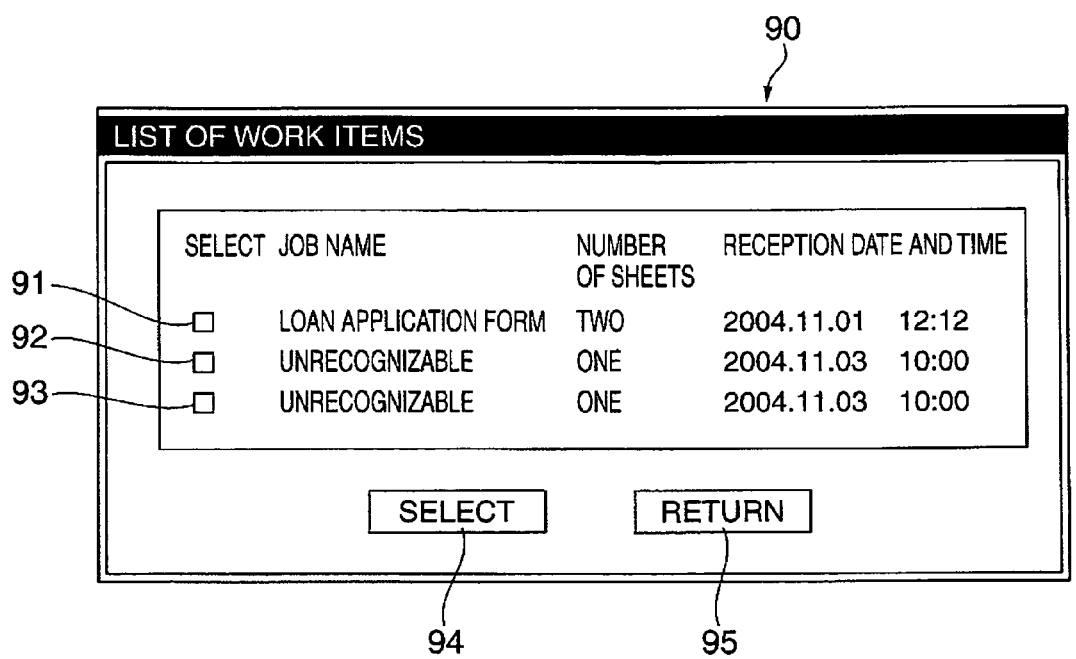
FIG. 10 is a view showing an example of a screen showing a list of work items displayed on a client PC after login.

By logging into the system from the login screen 80, jobs requested in advance by users (operators) can be displayed on a screen in FIG. 10.

FIG. 10 is a view showing an example of a work item list screen displayed on the client PC after login.

In FIG. 10, jobs 91 to 93 that have been subjected to form recognition are displayed on the work item list screen 90. The job 91 is comprised of forms that have been recognized as belonging to a "loan application" as a result of form recognition. A job name "loan application", the number of forms "two", and the date and time of reception "Nov. 1, 2004 12:12" are displayed with regard to the job 91.

The jobs 92 and 93 are forms that have been determined as being unrecognizable forms as a result of form recognition. The number of forms "1" and the date and time of reception "Nov. 3, 2004 10:00" are displayed with regard to the job 92. The number of forms "1" and the date and time of reception "Nov. 3, 2004 10:00" are displayed with regard to the job 93. The jobs 92 and 93 can be determined as being data of two forms received in one communication since they were acquired on the same date and at the same time. This screen display is implemented in the case where the check box 64 is checked and unrecognizable forms are treated as one job.

A selecting button 94 is for selecting a job or jobs for which check box(es) has been checked from among the jobs 91 to 93 displayed on the work item list screen 90. A return button 95 is for returning to the state before the present screen view is displayed.

When the PE selects a desired job from the list on the work item list screen 90 and depresses the selecting button 94, there occurs a shift from the work item list screen 90 to an edit/correction screen, not shown, on which the PE can edit and correct the character recognition result. If there are a plurality of PEs, each PE logs into the system from the login screen 80 of his/her client PC to display the work item list screen 90. If all the PEs log into the system at the same time, they can view jobs that can be currently processed.

For example, assuming that one PE A selects the job 92 and another PE B selects the job 93, there is the possibility that the jobs 92 and 93 are one set of two loan application forms although they are unrecognizable forms. In this case, if the jobs 92 and 93 are processed by the different PEs, return processing will be complicated and troublesome. In the circumstances where such situation frequently occurs, the check box 64 may be cleared.

Figure 11:
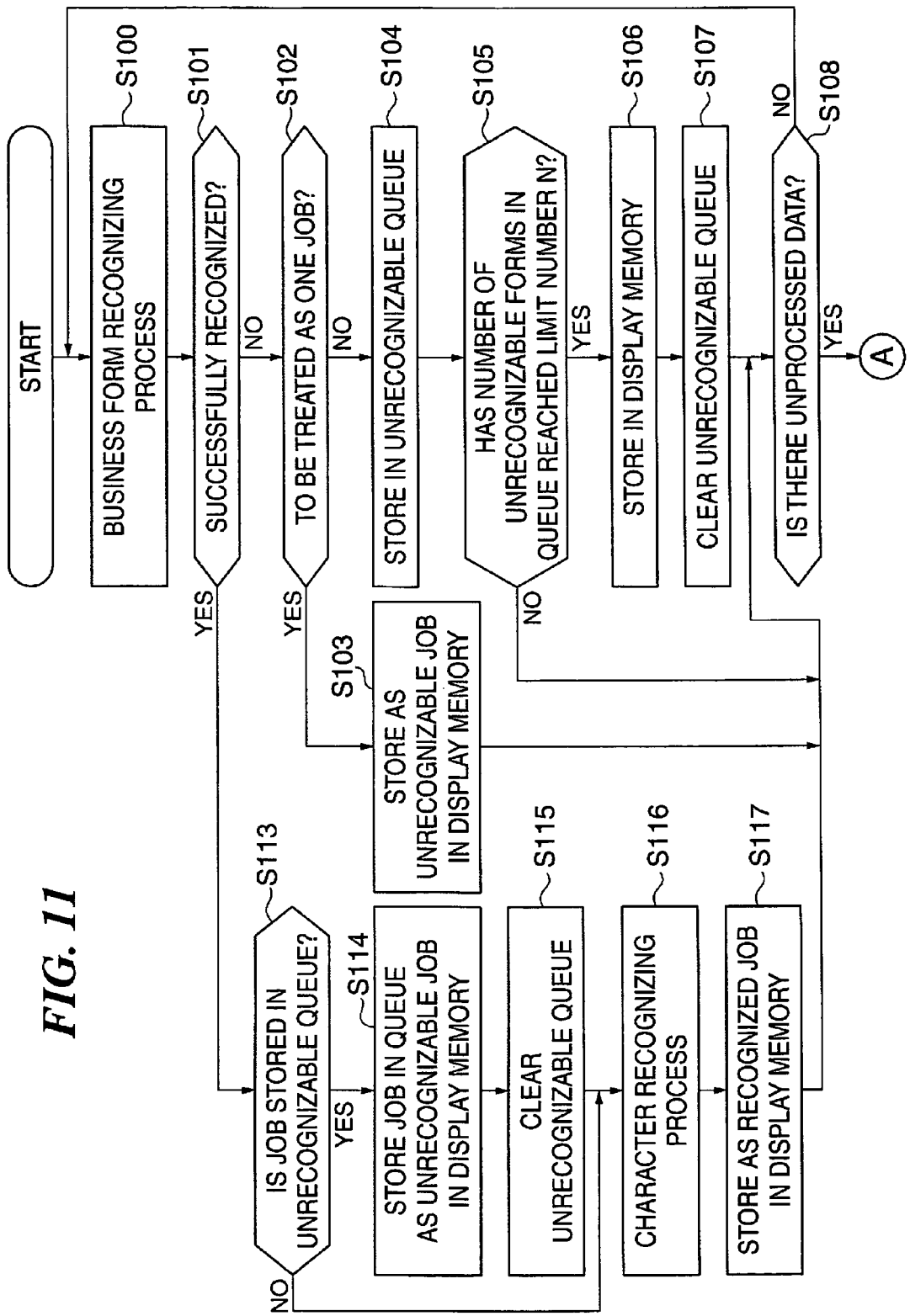
FIG. 11 is a flow chart showing part of an example of the form display method.
Figure 12:
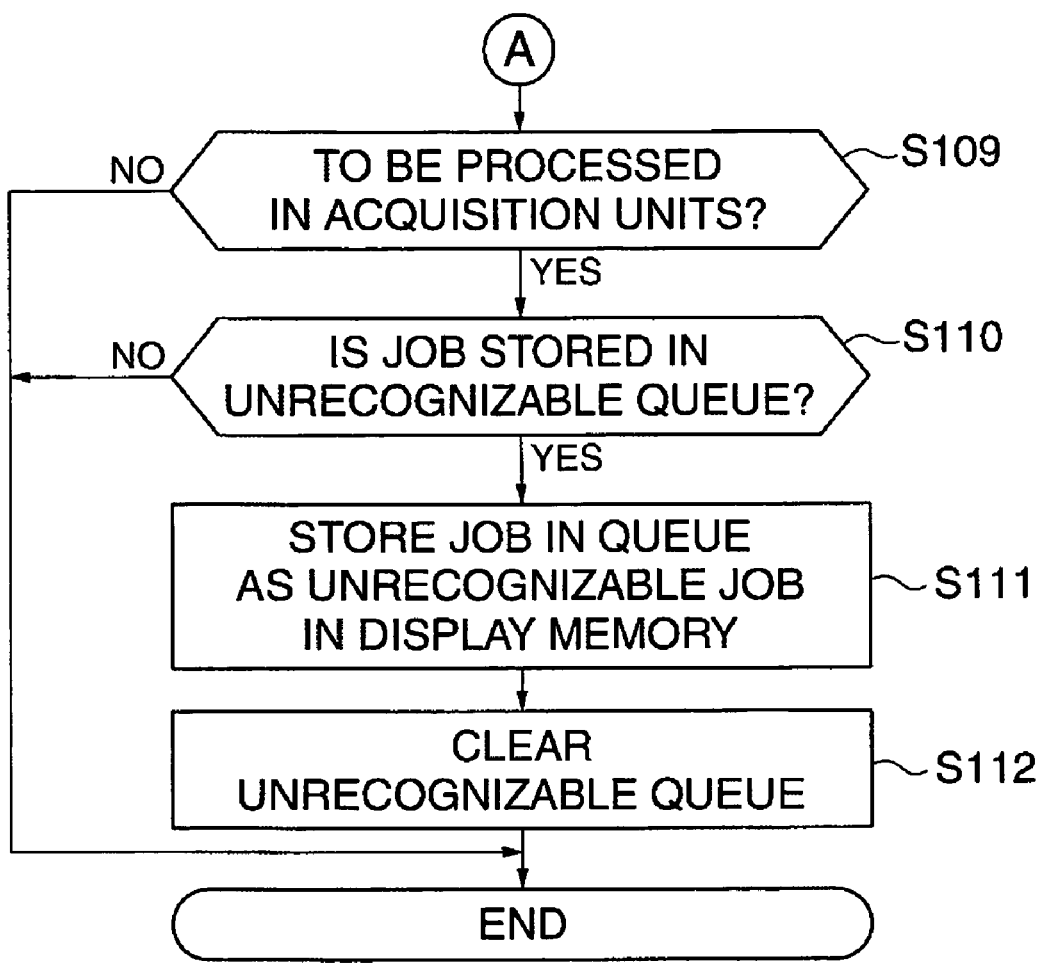
FIG. 12 is a flow chart showing a continued part of the example partly shown in FIG. 11.
Figure 13:
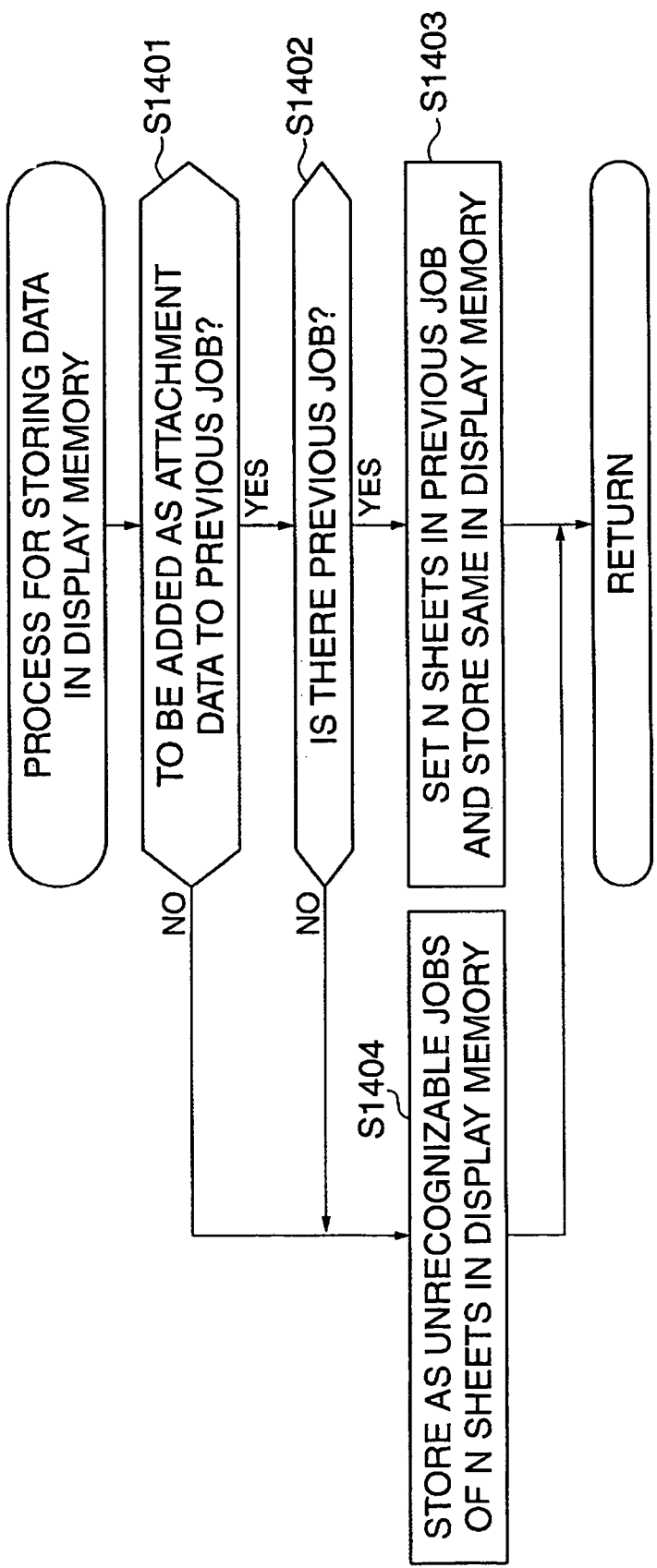
FIG. 13 is a flow chart showing in detail a process in a step S106 in FIG. 11 in which data is stored in a display memory.

Referring next to FIGS. 11 to 13, a description will be given of a form display method according to the present embodiment.

FIGS. 11 and 12 are flow charts showing an example of the form display method. This method is implemented by a work flow control module included in the module 307, and corresponds to the steps S2 to S4 in the work flow in FIG. 4.

As shown in FIG. 11, in a step S100, the Web application server 109 acquires image data of a form and carries out form recognition in accordance with a request from the client PC 101. Specifically, the Web application server 109 recognizes the type of the acquired form.

Next, in a step S101, it is determined whether or not an image of one form has been successfully recognized. Specifically, it is checked whether or not the image being recognized corresponds in type to any of forms represented by pieces of form information registered in advance. If the image does not correspond in type to any of forms registered in advance, the image is determined as being an unrecognizable form. On the other hand, if the image corresponds to any of forms registered in advance, it is then recognized what type of form corresponds to the image. If it is determined in the step S101 that the image has been successfully recognized, the process proceeds to a step S113. On the other hand, if it is determined in the step S101 that the image has not been successfully recognized, the process proceeds to a step S102.

In the step S102, it is determined whether or not the image determined as being an unrecognizable form is to be treated as one job. Specifically, it is determined whether or not the check box 64 on the unrecognizable form setting screen 60 is checked. If the check box 64 is checked, it is determined that the image determined as being an unrecognizable form is to be treated as one job, and the process proceeds to a step S103. In the step S103, data of the image is stored as an unrecognizable job in the hard disk 10 (hereinafter referred to as "the display memory"), and the process proceeds to a step S108.

On the other hand, if it is determined in the step S102 that the check box 64 is unchecked, it is determined that the image determined as being an unrecognizable form is not to be treated as one job, and the process proceeds to a step S104 wherein data of the image is stored in an unrecognizable queue (step S104). The unrecognizable queue is a hold queue in which forms whose types cannot be recognized as a result of form recognition are temporarily stored.

Next, in a step S105, it is determined whether or not the number of pieces of image data stored in the unrecognizable queue, i.e., the number of unrecognizable forms has reached a limit number N entered into the area 62. If it is determined that the number of unrecognizable forms has not yet reached the limit number N, the process proceeds to the step S108. On the other hand, if it is determined that the number of unrecognizable forms has reached the limit number N, Image data of the unrecognizable forms is stored in the display memory (step S106), and then the unrecognizable queue is cleared (step S107). The process then proceeds to the step S108.

In the step S108, it is determined whether or not there is any image data that has not been subjected to form recognition in image data of acquired forms. If there is any image data that has not been subjected to form recognition, the process returns to the step S100. On the other hand, if there is no image data that has not been subjected to form recognition, the process proceeds to a step S109 in FIG. 12.

In the step S113 shown in FIG. 11, it is determined whether or not a job is stored in the unrecognizable queue. If it is determined that no job is stored in the unrecognizable queue, the process proceeds to a step S116. On the other hand, if it is determined that a job is stored in the unrecognizable queue, image data of unrecognizable forms in the unrecognizable queue is stored in the display memory (step S114), and then the unrecognizable queue is cleared (step S115). The process then proceeds to the step S116.

In the step S116, character recognition is carried out on the image whose form type has been determined. Although in the present embodiment, character recognition is carried out, another process may be carried out depending on the circumstances, or the step S116 may be omitted.

Next, in a step S117, the image data on which character recognition has been carried out is stored as a recognized job in the display memory, and the process proceeds to the step S108.

In the step S109 in FIG. 12, it is determined whether or not processing is to be performed in data acquisition units. Specifically, it is determined whether or not the check box 63 on the unrecognizable form setting screen 60 is checked. If it is determined that the check box 63 is unchecked, the present process is terminated. On the other hand, if it is determined that the check box 63 is checked, it is determined whether or not a job is stored in the unrecognizable queue (step S110). If, as a result, it is determined that no job is stored in the unrecognizable queue, the present process is terminated. On the other hand, if it is determined that a job is stored in the unrecognizable queue, image data in the unrecognizable queue is stored in the display memory (step S111), and then the unrecognizable queue is cleared (step S112), followed by termination of the present process.

FIG. 13 is a flow chart showing in detail the process in the step S106 in FIG. 11 in which image data is stored in the display memory.

As shown in FIG. 13, it is determined in a step S1401 whether or not image data of unrecognizable forms is to be attached to a previous job. Specifically, it is determined whether or not the check box 61 on the unrecognizable form setting screen 60 is checked. If, as a result, it is determined that the check box 61 is checked, the process proceeds to a step S1402. On the other hand, if it is determined that the check box 61 is unchecked, the process proceeds to a step S1404 wherein image data stored in the unrecognizable queue is stored as unrecognizable jobs of N sheets in the display memory (step S1404), and the process returns to the step S107 in FIG. 11.

In the step S1402, it is determined whether or not there is a previous job. Here, it is determined whether or not there is a previous job stored in the display memory. If, as a result, it is determined that there is no previous job, the process proceeds to the step S1404. On the other hand, if it is determined that there is a previous job, the process proceeds to a step S1403 wherein image data of N forms stored in the unrecognizable queue is added as an unrecognizable job to the previous job and stored in the display memory (step S1403).

In the above process, whether unrecognizable forms are to be added as attachment data to a previous job or treated as an unrecognizable job is determined based upon whether or not the check box 61 is checked and whether or not there is a previous job stored in the display memory.

The form recognition result representations 1 to 4 in FIGS. 6A to 6D described above can selectively be displayed based upon images stored in the display memory by the processes in FIGS. 11 to 13. For example, the form recognition result representation 1 can be obtained by carrying out the steps S113 to S117 three times, the step S103 twice, and the step S111 once in this order, because acquired form data is recognized as including loan forms, address change forms, loan forms, and unrecognizable forms. The form recognition result representation 2 can be obtained by carrying out the steps S113 to S117 three times, the step S1403 once, and the step S1404 once in this order when the limit number N entered into the area 62 is equal to 1.

The form recognition result representation 3 can be obtained by carrying out the steps S113 to S117 three times and then the step S1403 twice when the limit number N entered into the area 62 is 1. The form recognition result representation 4 can be obtained by carrying out the steps S113 to S117 three times and then the step S1403 once when the limit number N entered into the area 62 is 2.

A program for implementing the processes in FIGS. 11 to 13 is activated at the same time when the system is started up, and starts processing at the same time when image data of forms is acquired.

Figure 14:
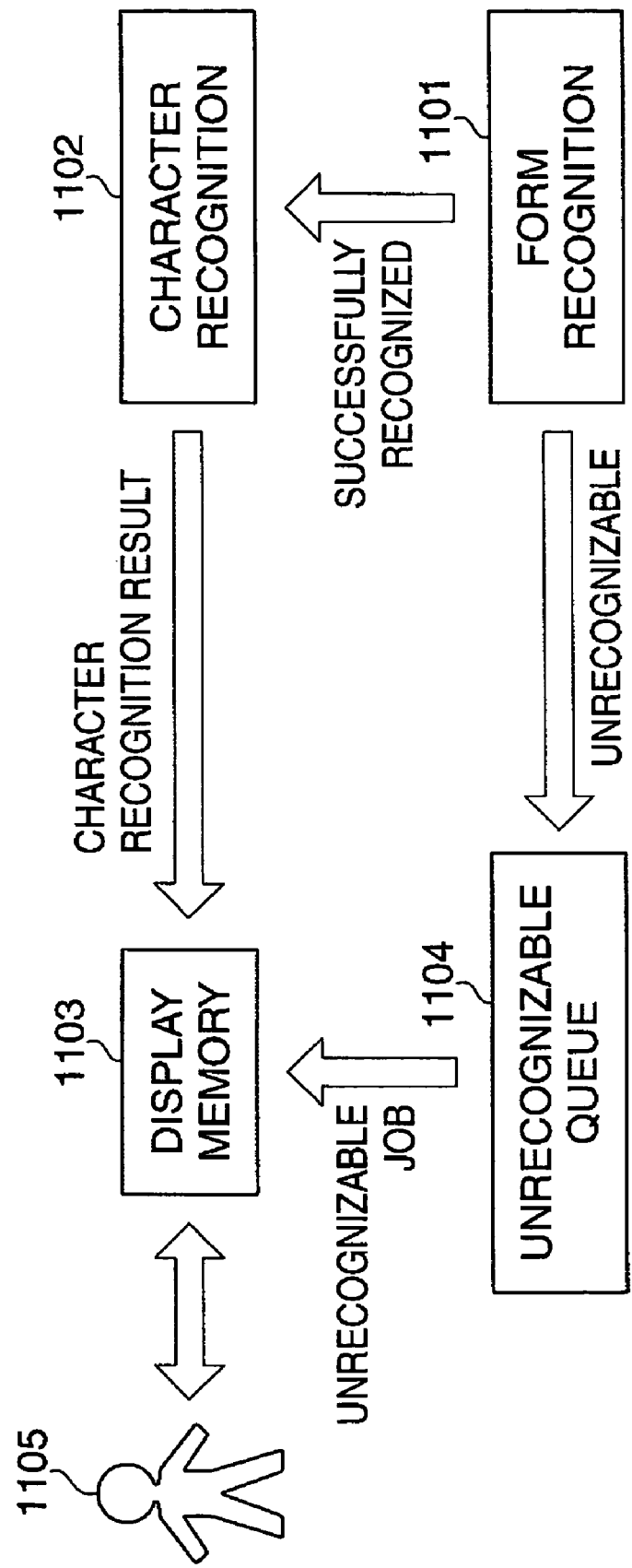
FIG. 14 is a block diagram showing the overall configuration of a module for carrying out the processes shown in FIGS. 11 to 13.

FIG. 14 is a block diagram showing the overall configuration of a module for carrying out the processes in FIGS. 11 to 13.

In FIG. 14, reference numeral 1101 denotes a form recognition block for carrying out form recognition; 1102, a character recognition block for carrying out character recognition; 1103, a display memory corresponding to the VRAM 14 in the client PC; 1104, the above-mentioned unrecognizable queue; and 1105, an operator.

When form recognition on form data by the form recognition block 1101 is completed, the form data that has been successfully recognized are transferred to the character recognition block 1102. When character recognition by the character recognition block 1102 is completed, the character recognition result is stored in the display memory 1103. On the other hand, if the form recognition on form data by the form recognition block 1101 has not been successful, the form data is stored as an unrecognizable job in the display memory 1103 via the unrecognizable queue 1104 in accordance with settings on the unrecognizable form setting screen 60. When the operator 1105 logs into the system from the client PC, the contents stored in the display memory (VRAM 14) are displayed on the work item list screen 90.

Referring next to FIGS. 15 and 16, a description will be given of a screen for separating unrecognizable forms from one job or combining unrecognizable forms into one job.

FIGS. 15 and 16 are views showing an example of the screen for separating unrecognizable forms from one job or combining unrecognizable forms into one job. The screen is displayed by a recognition result registration module included in the module 307 when the selecting button 94 is depressed after a plurality of jobs are selected on the work item list screen 90

As shown in FIG. 15, a previous job display button 1202, a present job display button 1203, and a next job display button 1204 are arranged on a display screen 1200 so that three form jobs can be displayed. Also, a previous job moving button 1201 for moving to a screen view showing a form job preceding the previous job, and a next job moving button 1205 for moving to a screen view showing a form job following the next job are arranged on the display screen 1200.

The present job display button 1203 is for displaying a form job that is currently selected; in the illustrated example, a form job comprised of unrecognizable forms that have been determined as being unrecognizable is displayed. When the present job display button 1203 is depressed, seven unrecognizable forms included in the present form job are displayed in an area 1207.

The previous job display button 1202 is for displaying a form job preceding the form job that is currently selected; in the illustrated example, the previous form job is recognized as a "home loan." The next job display button 1204 is for displaying a form job following the form job that is currently selected; in the illustrated example, the next form job is recognized as an "application form."

A previous form button 1206 is for moving (separating/combining) a selected page or pages (document(s)) of the form job displayed in the area 1207 to the previous form job. In response to depression of the previous form button 1206, a selected page or pages are moved from the present job to the previous job. For example, as shown in FIG. 16, when the first page and the second page are selected from the form job displayed in the area 1207 on the display screen 1500, these pages are highlighted. If the previous form button 1206 is then depressed, the first and second pages are moved to the previous job.

A next form button 1208 is for moving (separating/combining) a selected page or pages (document(s)) of the form job displayed in the area 1207 to the next form job. In response to depression of the next form button 1208, the selected page or pages are moved from the present job to the next job.

A new job generating button 1209 is for registering a page or pages selected from the form job displayed in the area 1207 as a new job. When the new job generating button 1209 is depressed and a form name is input, the registered form job is displayed in the same format as the previous job.

According to the above described embodiment, the user is enabled to set in advance how to deal with unrecognizable forms included in acquired form data on the unrecognizable form setting screen 60, and when form data is acquired from the client PC, the types of forms are recognized. Those of recognized forms which do not correspond in type to any of forms registered in advance are regarded as unrecognizable forms, and the recognized forms including the unrecognizable forms are displayed according to settings on the unrecognizable form setting screen 60. Thus, any of the form recognition result representations 1 to 4 in FIGS. 6A to 6D can selectively be obtained in the case where form recognition is carried out on electronic images obtained by reading documents of unknown types. This enhances convenience for an operator who corrects the form recognition result, so that the operator can properly perform correction.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded via a network.

Further, it is to be understood that the functions of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

In this case, the program code is supplied directly from a storage medium storing the program code, or by downloading from another computer, a database, or the like connected to the Internet, a commercial network, a local area network, or the like.

This application claims the benefit of Japanese Application No. 2005-017411, filed Jan. 25, 2005, which is hereby incorporated by reference herein in its entirety.

What is claimed is:

1. A form display method for an information processing apparatus, the method comprising:
    an acquiring step of acquiring at least one electronic image;
    a recognizing step of recognizing a form type of each of the acquired at least one electronic image;
    a determining step of determining whether the form type of the acquired at least one electronic image corresponds to any of forms registered or is an unrecognizable form;
    a setting step of setting a method of displaying the at least one electronic image if the determining step determines that the at least one electronic image is the unrecognizable form; and
    a displaying step of displaying the at least one electronic image determined to be the unrecognizable form in accordance with the set display method,
    wherein said setting step determines whether the unrecognizable form is to be added as attachment data to another electronic image determined as corresponding to one of the forms registered in advance and sets according to the determination.

2. A form display method according to claim 1, wherein:
    said setting step, in a case where the setting step sets the unrecognizable form to be added as attachment data to the another electronic image determined as corresponding to one of the forms registered in advance, sets a limit on a number of unrecognizable forms to be added as the attachment data, and
    said displaying step, when the number of unrecognizable forms to be added as the attachment data reaches the limit, displays the unrecognizable forms separately from the at least one electronic image subsequently determined as being unrecognizable forms.

3. A form display apparatus that carries out form recognition on electronic images obtained by reading images of various documents, the form display apparatus comprising:
    an acquiring device that acquires at least one electronic image;
    a recognizing device that recognizes a form type of each of the acquired at least one electronic image;
    a determining device that determines whether the form type of the acquired at least one electronic image corresponds to any of forms registered or is an unrecognizable form;
    a setting device that sets a method of displaying the at least one electronic image if the determining device determines that the at least one electronic image is the unrecognizable form; and
    a display device that displays the at least one electronic image determined to be the unrecognizable form in accordance with the set display method,
    wherein said setting device determines whether the unrecognizable form is to be added as attachment data to another electronic image determined as corresponding to one of the forms registered in advance and sets according to the determination.

4. A form display apparatus according to claim 3, wherein:
    said setting device, in a case where said setting device sets the unrecognizable form to be added as attachment data to the another electronic image determined as corresponding to one of the forms registered in advance, sets a limit on a number of unrecognizable forms to be added as the attachment data, and
    said display device, when the number of unrecognizable forms to be added as the attachment data reaches the limit, displays the unrecognizable forms separately from at least one electronic image subsequently determined as being unrecognizable forms.

5. A non-transitory computer-readable storage medium storing a computer program executable by a computer to implement a form display method, comprising:
   an acquiring step of acquiring at least one electronic image;
   a recognizing step of recognizing a form type of each of the acquired at least one electronic image;
   a determining step of determining whether the form type of the acquired at least one electronic image corresponds to any of forms registered or is an unrecognizable form;
   a setting step of setting a method of displaying the at least one electronic image if the determining step determines that the at least one electronic image is the unrecognizable form; and
   a display step of displaying the at least one electronic image determined to be the unrecognizable form in accordance with the set display method.

* * * * *